United States Patent [19]

Inui

[11] Patent Number: 4,888,601

[45] Date of Patent: Dec. 19, 1989

[54] IMAGE RECORDING APPARATUS AND METHOD

[75] Inventor: Toshiharu Inui, Yokohama, Japan

[73] Assignee: Canon Kabushiki Kaisha, Tokyo, Japan

[21] Appl. No.: 124,833

[22] Filed: Nov. 24, 1987

[30] Foreign Application Priority Data

Nov. 27, 1986 [JP] Japan ............................... 61-280734

[51] Int. Cl.$^4$ ............................................ G01D 15/10

[52] U.S. Cl. ................................ 346/76 PH; 200/120

[58] Field of Search ........................... 346/76 PH, 1.1; 400/120

[56] References Cited

U.S. PATENT DOCUMENTS

| | | | |
|---|---|---|---|
| 4,349,269 | 9/1982 | Okada | 355/14 |
| 4,373,801 | 2/1983 | Itoh | 355/14 |
| 4,719,489 | 1/1988 | Ohkubo et al. | 355/3 |

FOREIGN PATENT DOCUMENTS

| | | | |
|---|---|---|---|
| 0205083 | 12/1986 | European Pat. Off. | 400/120 |
| 0054949 | 3/1986 | Japan | 346/76 PH |
| 2094384 | 4/1987 | Japan | 346/76 PH |

*Primary Examiner*—Bruce A. Reynolds
*Assistant Examiner*—Huan Tran
*Attorney, Agent, or Firm*—Fitzpatrick, Cella, Harper & Scinto

[57] ABSTRACT

Disclosed are an apparatus for and a method of recording images on a recording medium by utilizing a transfer medium having a transfer layer whose transfer characteristics are caused to change by the application of a first energy and a second energy which differs from the first energy. The image recording apparatus includes a conveying device for conveying the transfer medium, a recording section disposed along the conveying path of the transfer medium conveyed by the conveying device, the recording section having a first energy applying device for applying the first energy to the transfer medium and a second energy applying device for applying the second energy to the transfer medium, a transfer section having a heating device and a pressure applying device used to transfer the image formed on the transfer medium in the recording section on the recording medium, and a fixing section for fixing the image transferred on the recording medium in the transfer section to the recording medium. The fixing section applies heat and pressure to the recording medium, and either of the heat and pressure or both of them is set to a value or values which is higher than that of the heat or pressure or both of them applied in the transferred section. The image recording method includes the steps of applying the first energy and the second energy to the transfer medium, transferring the image formed on the transfer medium by the energy applying step to the recording medium, and fixing the image transferred to the recording medium in the transfer step to the recording medium. Heat and pressure are applied to the recording medium in the fixing step, and either of the heat and pressure or both of them applied to the recording medium in the fixing step is set to a value or values which is higher than that of the heat or pressure or both of them employed in the transfer step.

26 Claims, 11 Drawing Sheets

IMAGE RECORDING APPARATUS AND METHOD

BACKGROUND OF THE INVENTION

1. Field of the Invention:

The present invention relates to an apparatus for and a method of recording images which can be applied to printers, copiers, electronic typewriters or facsimile machines.

2. Related Background

As various types of information processing system have been developed recently along with the rapid growth of the information industry, various recording apparatuses which suit these information processing systems have also been developed.

One example is a thermal recording apparatus which employs an ink ribbon for recording information on paper sheets. The ink ribbon is composed of a ribbon-shaped base and a hot-melt ink coated on the base, the ink containing a hot-melt binder and coloring agents dispersed in the binder.

Specifically, to record ink images on sheets of recording paper by application of heat in this thermal recording apparatus, the ink ribbon is brought into contact with the sheet of recording paper in such a manner that its layer of hot-melt ink faces the recording paper sheet. The ink ribbon and the recording paper sheet are then conveyed between a thermal head and a platen, during which pulse-like heat is applied to the ink ribbon and the recording paper sheet by the thermal head from the side of the base of the ink ribbon in accordance with the picture signals, and at the same time both the ink ribbon and recording paper sheet are pressed against each other so that melted ink is transferred onto the recording paper sheet.

Since this type of recording apparatus requires small and light-weight components, and should make no noise and be capable of employing sheets of normal paper, it has been widely used in recent years.

However, the conventional thermal recording apparatuses have the disadvantages described below.

Firstly, the image quality is greatly affected by the surface smoothness of the sheets of recording paper. In other words, excellent images can be recorded on a sheet of recording paper which has a high degree of smoothness, but the quality of the recorded images may decrease with a sheet of recording paper having a low degree of smoothness.

Further, when a multi-color image is to be recorded in the conventional thermal recording apparatuses, the transfer process must be repeated to obtain a desired color. This requires a plurality of thermal heads, as well as a complicated form of movement of the recording paper sheet, such as suspension of movement and backward movement. Generation of color unmatching is therefore inevitable, and large and complicated kinds of equipment are necessitated.

Accordingly, the present applicant has invented a method of recording images and a transfer medium which can obviate the above-described problems of the prior art and are capable of recording images of high quality on a recording medium having a low degree of surface smoothness. The present applicant has also invented a method of recording images and a transfer medium which are capable of recording multi-color images without requiring that the recording medium be moved in a complicated manner. The present applicant filed patent applications for these inventions at the Japanese Patent Office under application Nos. 120080/1985 (on June 3, 1985), 120081/1985 (on June 3, 1985), 131411/1985 (on June 17, 1985), 134831/1985 (on June 20, 1985), 150597/1985 (on July 9, 1985), 199926/1985 (on Sep., 10, 1985), and 250884/1985 (on Nov. 11, 1985). He also filed patent applications for these inventions in the U.S.A. (under application No. 869,689 on June 2, 1986, and in Europe.. (under application No. 86107540.6) on June 3, 1986 on the basis of a claim to priority.

The present invention which is described later is a further development of the above-described inventions for which the present applicant has already filed patent applications at the Japanese Patent Office, in the U.S.A., and in Europe, and it is to be noted that the present invention can adopt the methods of recording images and the transfer media disclosed in the specifications of the above-mentioned applications.

SUMMARY OF THE INVENTION

Accordingly, an object of the present invention is to provide an apparatus for and a method of recording images which are capable of recording images of high quality on recording media (such as sheets of normal paper of sheets of typewriter paper) having a low degree of surface smoothness.

Another object of the present invention is to provide an apparatus for and a method of recording images which are capable of recording vivid images.

Still another object of the present invention is to provide an apparatus for and a method of recording images which are capable of recording multi-color images without requiring transfer media or recording media to be moved in a complicated manner.

A further object of the present invention is to provide an apparatus for and a method of recording images which are capable of forming an image on a transfer medium and transferring this image onto a recording medium in two separate processes.

A still further object of the present invention is to provide an apparatus for and a method of recording images which are capable of firmly fixing the image transferred on a recording medium thereto.

Yet another object of the present invention is to provide an apparatus for and a method of recording images which have the transfer and fixing functions separated so as to eliminate application of excess pressure and heat in a transfer section, so that images on a transfer medium can be faithfully transferred onto a recording medium to enable fine image recording.

One further object of the present invention is to provide an apparatus for and a method of recording images which does not require a recording medium to be moved in a complicated manner and enables the quality of color mixture to be improved by the application of heat or pressure in a fixing section so as to achieve recording of high quality images when the present invention is applied to a multi-color recording.

BRIEF DESCRIPTION OF THE DRAWINGS

This invention relates to an apparatus for recording images used for recording images on a recording medium by utilizing a transfer medium having a transfer layer whose transfer characteristics are caused to change by the application of a first energy and a second energy which differs from said first energy, having a conveying means for conveying said transfer medium, a recording section disposed along the conveying path of said transfer medium conveyed by said conveying means, said recording section having a first energy applying means for applying said first energy to said transfer medium and a second energy applying means for applying said second energy to said transfer medium. The apparatus also employs a transfer section having a heating means and a pressure applying means used to transfer the image formed on said transfer medium in said recording section on said recording medium as well as a fixing section for fixing the image transferred on said recording medium in said transfer section to said recording medium. The fixing section applies heat and pressure to the recording medium and either heat and pressure or both of them applied to said recording medium in said fixing section is set to a value or values which is higher than that of the heat and/or pressure applied in the transfer section.

DETAILED DESCRIPTION OF THE INVENTION

Embodiments of an apparatus for and a method of recording images according to the present invention will be described below with reference to the accompanying drawings.

As stated before, it is to be noted that the embodiments of the present invention can adopt the methods of recording images and the transfer media disclosed in the specifications of the above-mentioned applications.

It is also to be noted that in the apparatus for and the method of recording images according to the present invention, images to be transferred are formed by a change in any of the properties which dominate the transfer characteristics. A suitable property is selected in accordance with the type of transfer medium being utilized. For example, it may be a melting temperature, a softening temperature, or a glass transition temperature, if the transfer medium is of a type in which the images are transferred to a recording medium in a melting state. Alternatively, it may be a certain viscosity at a given temperature, if a transfer medium is employed from which the images are transferred to a recording medium in an adherent or penetrating state thereto. In addition, a combination of suitable types of energy, including an optical electronic beam, heat, and pressure, can be employed in accordance with the type of transfer medium as a plurality of types of energy for forming transfer images.

Figure 1A:
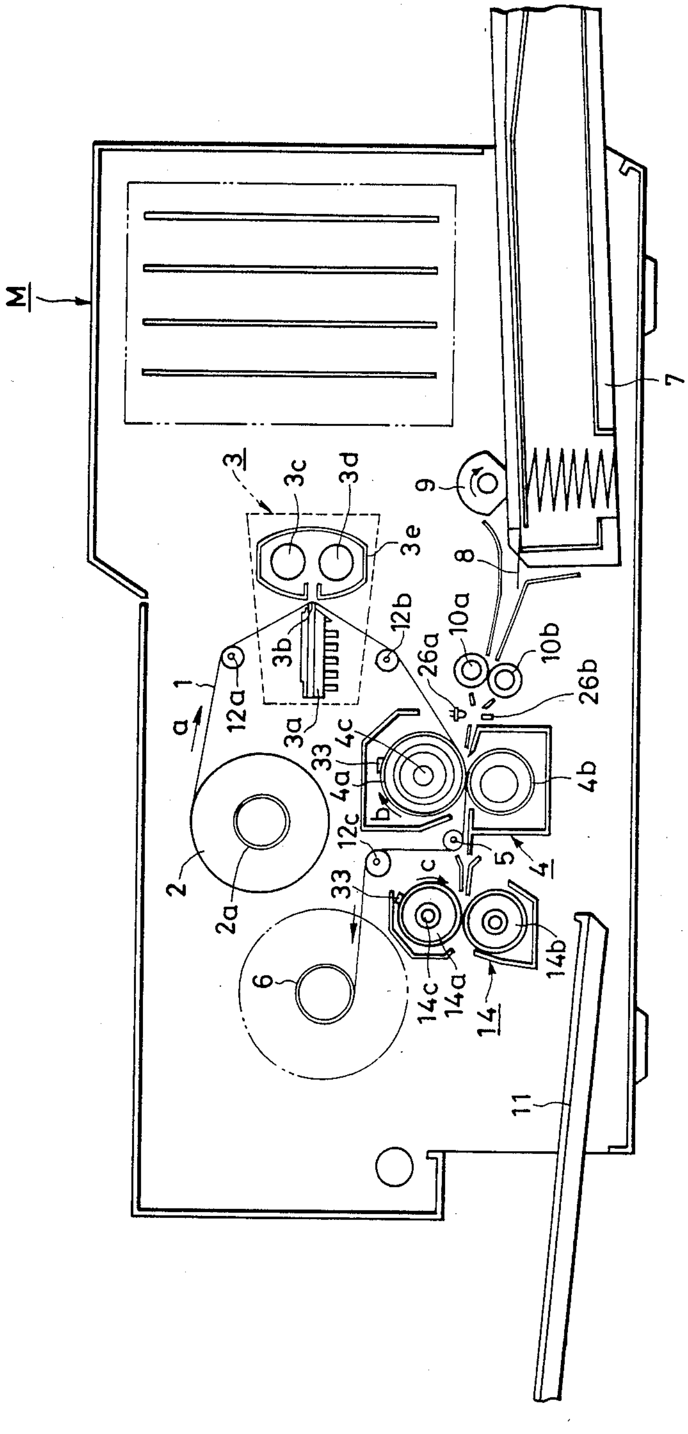
FIGS. 1A and 1B are schematic views of a first embodiment of the present invention.
Figure 1B:
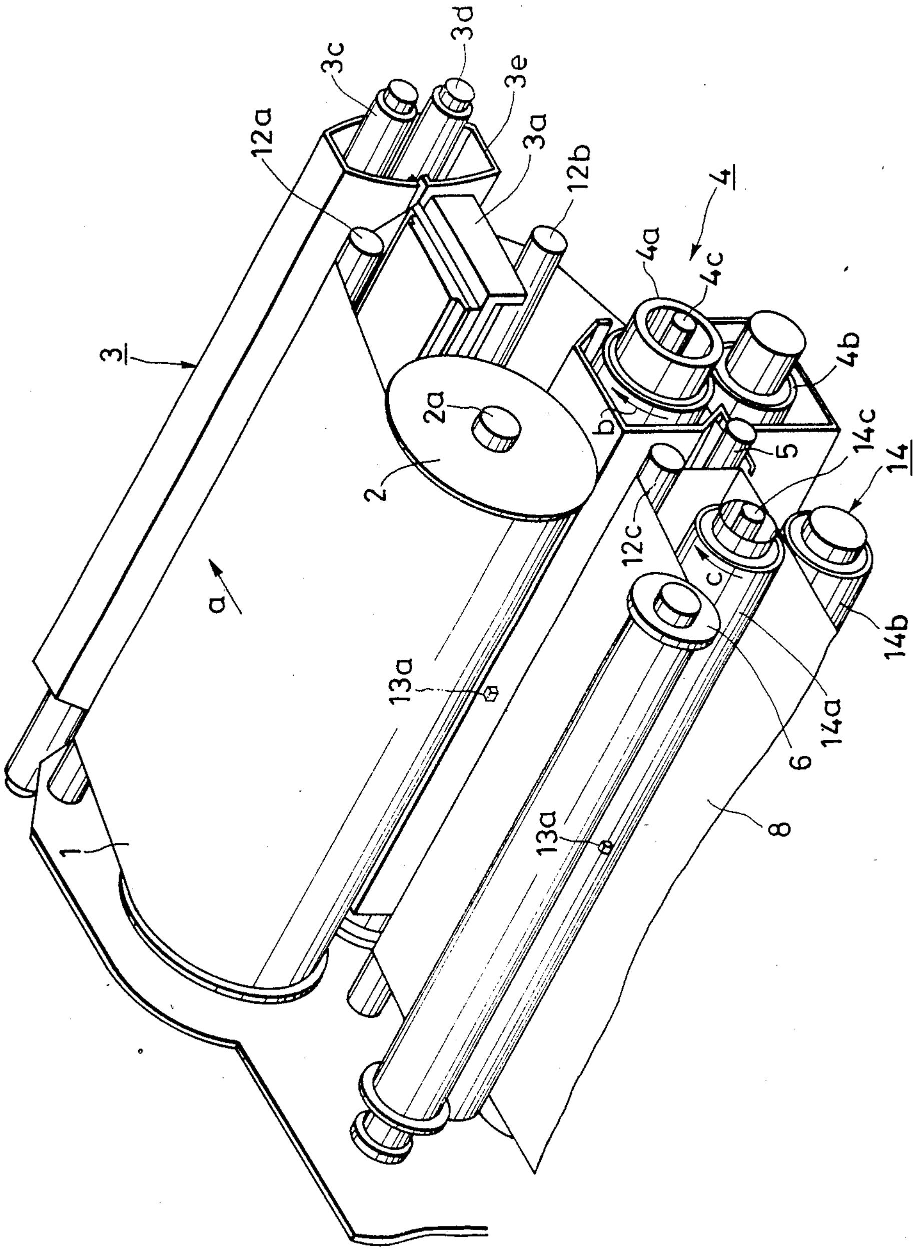

FIG. 1 (A) is a schematic cross-sectional view of an embodiment of an image recording apparatus according to the present invention, and FIG. 1 (B) is a perspective view thereof. The image recording method according to the present invention will also be described with reference to this embodiment.

A transfer medium 1 which is an elongated sheet wound on a supply roll 2 is removably incorporated in a main body M as the supply roll 2. More specifically, the supply roll 2 is detachably mounted on a rotary shaft **2*a*** provided in the main body M.

Firstly, the forward end of the transfer medium 1 is drawn out from the supply roll 2, via a guide roller **12*a*, a recording head 3*a*, a guide roller 12*b*, the gap between a transfer roller 4*a* and a pressurizing roller 4*b*, a peel-off roller 5, a guide roller 12*c*by means of which the direction of the medium 1 is changed, finally to a winding roll 6 to which it is fixed by a suitable means such as a gripper (not shown). Once the transfer medium 1 is set in this manner, it is moved in the direction indicated by an arrow a by the rotation of the transfer roller 4*a* by a known driving means and by the application of torque to the winding roll 6 in the direction indicated by an arrow c, and is sequentially wound around the winding roll 6**.

During winding, a certain backward tension is applied to the supply roll 6 by, for example, a hysteresis brake (not shown), so that the transfer medium 1 is pressed against the recording head **3*a* under a fixed degree of pressure and at a fixed angle during conveyance with the assistance of this backward tension and the guide rollers 12*a* and 12*b***.

The structure of each of the above-described components will be described in detail below one by one.

Figure 2:
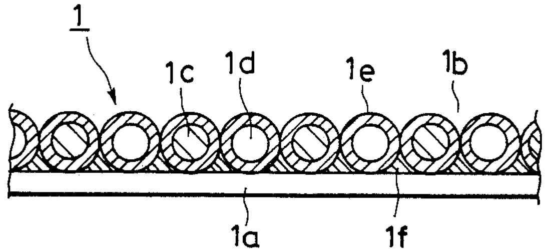
FIG. 2 shows the structure of a transfer medium.

The transfer medium 1 is composed of a sheet-like base **1*a* and a transfer layer 1*b* secured to the base 1*a*, as shown in FIG. 2. The transfer layer 1*b*** has characteristics which allow images to be formed when energy in the form of both heat and light is applied thereto.

The transfer layer **1*b* comprises, for example, microcapsular shaped image forming element assemblies formed by the following method using the components shown in Table 1 for its core 1*c* and the components shown in Table 1 for its core 1*d*, as shown in FIG. 2**.

TABLE 1

| Item | Component | Weight percentage |
|---|---|---|
| Polimerizable prepolymer | $(CH_2{=}CHCOOCH_2.CH_2.O.$ 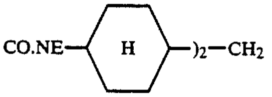 | 68 |
| Reaction initiator | Irgacure-184 (Ciba-Geigy)/ Ethyl-p-dimethylaminobenzoate | 2/ 2 |
| Binder | Elvasite 2041 (Du Pont) | 23 |
| Coloring agent | Sumitone Carmine (Sumitomo Chemical Co., Ltd.) | 5 |

TABLE 2

| Item | Component | Weight percentage |
|---|---|---|
| Polymerizable | $(CH_2{=}CHCOOCH_2.CH_2.O.$ | 68 |

TABLE 2-continued

| Item | Component | Weight percentage |
|---|---|---|
| prepolymer | 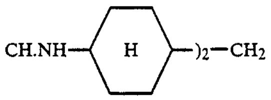 | |
| Reaction Initiator | 2-chlorothioxanthone/ Ethyl-p-dimethylaminobenzoate | 1.4/ 2 |
| Binder | Elvasite 2041 (Du Pont) | 23.6 |
| Coloring agent | Lionol Blue-FG-7330 (Toyo Ink Mfg. Co., Ltd.) | 5 |

Specifically, the respective groups of components shown in Tables 1 and 2 are mixed to produce two mixtures each weighing 10g, and to each of these mixtures is added 20 parts by weight of methylene chloride. Each of the mixtures is then mixed with 200 ml of an aqueous solution of 1g of gelatin and a surface active agent having a hydrophilic-lipophilic balance of 10 or above, such as a calionic surface active agent or a nonionic surface active agent. The resulting solutions are each stirred and emulsified by a homomixer at 8,000 to 10,000 rpm at a temperature of 60° C. until the droplets of the emulsion have an average diameter of 26 μm.

Each of the solutions is then stirred for a further 30 minutes at a temperature of 60° C. so that its droplets have an average diameter of about 10 μm as a result of the removal of methylene chloride. Thereafter, 20 ml of an aqueous solution of 1g of gum arabic is added to each solution, and ammonium hydrate ($NH_4OH$) is then added to each solution while being slowly cooled so as to obtain micro-capsular slurries each having a pH of 11 or above. 1.0 ml of a 20% aqueous solution of glutaric aldehyde is slowly added to each slurry so that the capsule walls form.

Subsequently, each of the slurries is solid-liquid separated using a Nutche funnel, and is dried for 10 hours at a temperature of 35° C. by a vacuum dryer to obtain micro-capsule image forming element assemblies.

The thus-obtained image forming element assemblies are each in the form of a micro-capsule whose cores 1c and 1d respectively made of the components shown in Tables 1 and 2 are coated with a shell 1e. The diameter of the particles of each of the image forming element assemblies is between 7 and 15 μm with an average diameter of about 10 μm.

To prepare the transfer medium 1, each of the thus-formed image forming element assemblies is adhered to the base 1a by means of an adhesive 1f. More specifically, the surface of the base 1a is coated with the adhesive 1f which consists of a 1 : 3 mixture of a polyester adhesive made by Nippon Synthetic Chemical Industry Co., Ltd. known as Polyester LP-022 (containing 50% solid matter), and toluene. The solvent of the adhesive 1f is then removed by drying the adhesive until the thickness thereof becomes about 1 μm. Since the glass transition point of this adhesive 1f is −15° C. and the adhesive therefore maintains a slight tackiness at room temperature, adherence of the image forming element assemblies on the base 1a is facilitated.

Subsequently, the micro-capsular image forming element assemblies formed in the manner described above whose cores are respectively made of the components shown in Tables 1 and 2 are mixed with each other in equal proportions. The mixture is then sprinkled on and adhered to the adhesive 1f. Excess image forming element assemblies are brushed off, so that the image forming element assemblies are disposed on the adhesive in a layer at a rate of 90%.

Subsequently, the image forming element assembly layer is firmly fixed to the base 1a under a pressure of about 1 kg/cm$^2$ and by applying heat energy of about 80° C. to form the transfer medium 1.

Figure 3:
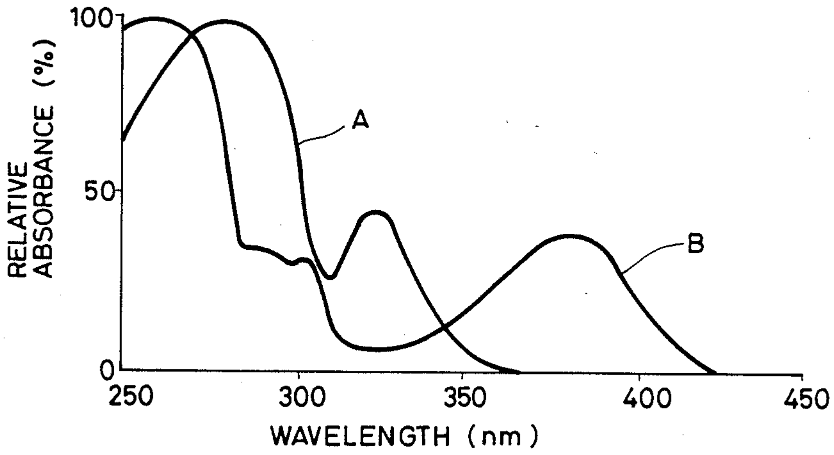
FIG. 3 is a graph showing absorption characteristics of reaction initiators contained in the transfer medium.

The reaction initiator contained in the image forming element assembly containing the components shown in Table 1 is of a type which initiates reaction by absorbing light having the wavelength shown by A in FIG. 3 which shows light absorption characteristics of the reaction initiators and turns to magenta during the formation of images. The reaction initiator contained in the image forming element assembly containing the components shown in Table 2 is of a type which initiates reaction by absorbing light having the wavelength shown by B in FIG. 3 and turns to blue during image formation.

Regarding a recording section 3, this section includes a heating means for applying heat energy constituting a first energy to the transfer medium 1, and a light irradiating means for applying to the transfer medium 1 light energy which constitutes a second energy.

The heating means comprises the recording head 3a having a line-type A-4 size heating element array 3b disposed on the surface of the recording head for heating the transfer medium in accordance with picture signals. The heating element array has a width of 0.2 mm with its elements arranged at a rate of 8 dots/mm. As stated before, the side of the transfer medium 1 on which the base 1a is provided is pressed against the heating element array 3b under a predetermined pressure during the conveyance of the transfer medium 1 by the backward tension applied during conveyance. The picture signals are generated from an external picture signal generator 32 (FIG. 6) such as a facsimile machine, an image scanner, or an electric black board.

Two 20 W fluorescent lamps 3c and 3d which constitute the light irradiating means are disposed at about 15 to 35 mm away from the transfer medium 1 on the opposite side from the recording head 3a in such a manner as to face the transfer layer 1b. The fluorescent lamps 3c and 3d have the spectral characteristics shown in FIG. 4.

Slit plates 3e are provided at about 0.5 mm away from the transfer medium 1. They are separated from each other by a gap of 1.2 mm to form an opening through which the light from the fluorescent lamps 3c and 3d are irradiated only on the region of the transfer medium 1 which are positioned immediately above the heating element array while the transfer medium 1 is pressed against the recording head 3a.

Figure 4:
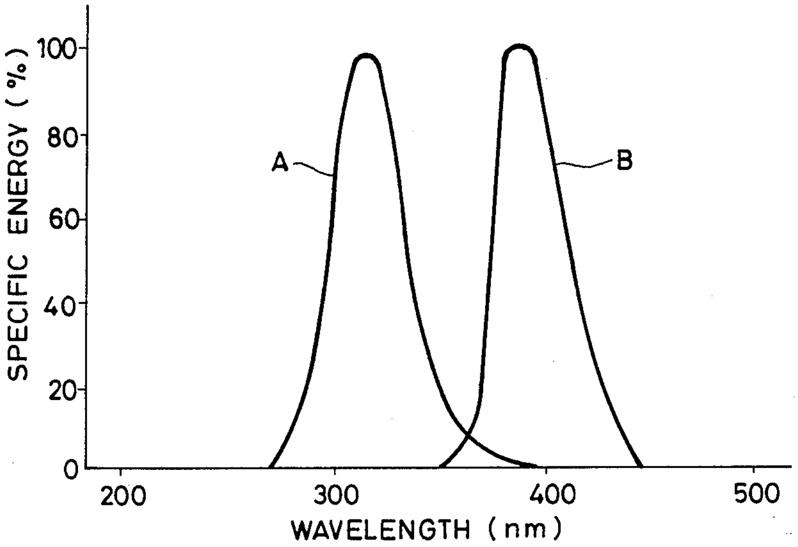
FIG. 4 is a graph showing the spectral characteristics of a light irradiating means.

The present embodiment employs, as the fluorescent lamp 3c having the spectral characteristics indicated by A in FIG. 4, 20W health ray fluorescent lamp FL20SE manufactured by Toshiba Corporation, and uses 20W fluorescent lamp FL1-A70E39 also produced by Toshiba Corporation as the other fluorescent lamp 3d having the spectral characteristics indicated by B in FIG. 4.

Regarding a transfer section 4, this section 4 is disposed downstream the recording section 3 in the direction of conveyance of the transfer medium 1. The transfer section 4 includes the transfer roller 4a rotatingly driven in the direction indicated by the arrow b shown in FIG. 1, and the pressurizing roller 4b pressing against the transfer roller 4a.

The transfer roller 4a is an aluminum roller coated with a 1-mm thick layer of silicone rubber having a hardness of 70. An 800 W halogen heater 4c is incorporated in the transfer roller 4a to heat the surface of the roller 4a at a temperature of 90 to 1000° C.

Figure 12:
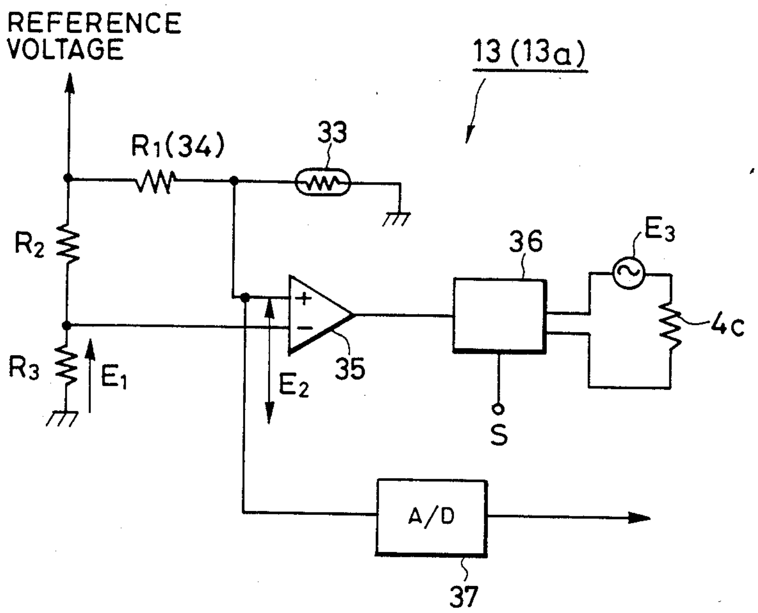
FIG. 12 shows the systems for controlling the temperatures of transfer and fixing sections.

The temperature of the surface of the transfer roller 4a is kept in a predetermined range by a temperature adjusting circuit 13 shown in FIG. 12. The temperature adjusting circuit 13 includes: a thermistor 33 mounted in the vicinity of the surface of the transfer roller 4a; three resistors R1 (34), R2 and R3 which together with the thermistor 33 form a bridge; a comparator 35 for comparing the output of the thermistor 33 in the bridge and a reference voltage E1, the comparator also outputting a high-level signal when the temperature of the transfer roller 4a is lower than the predetermined temperature (between 90 and 100° C.) and a low-level signal which the temperature is higher than the predetermined temperature; a switching circuit 36 for switching the heater 4c on when the comparator 35 outputs a high-level signal and switching it off when the signal output from the comparator is a low signal on the basis of a reference timing signal S so as to control the temperature of the surface of the transfer roller 4a at the predetermined temperature; and the heater 4c.

The pressurizing roller 4b is an aluminum roller coated with a 1-mm thick layer of silicone rubber having a hardness of 70. The pressure applied between the pressurizing roller 4b and the transfer roller 4a is set to 6 to 7 kgf/cm by a pressurizing means such as a spring (which is described later with reference to FIG. 13).

With regard to fixing section 14, this section 14 is disposed downstream the peel-off roller 5 in the direction of conveyance of the recording medium. The fixing section 14 includes a fixing roller 14a constituting a fixing member rotatingly driven in the direction indicated by the arrow c in FIG. 1, and a pressurizing roller 14b constituting a pressure applying roller pressed against the fixing roller 14a. The fixing roller 14a is an aluminum roller whose surface temperature is heated by an 800 W halogen heater 14c incorporated therein up to 120 to 130° C. which is higher than that of the transfer roller 4a. This surface temperature is controlled by a temperature adjusting circuit 13a shown in FIG. 12 which has the same structure as that for the transfer roller 4a.

The pressurizing roller 14b is an aluminum roller coated with a 1-mm thick layer of silicone rubber having a hardness of 70. The pressure applied between the pressurizing roller 14b and the fixing roller 14a is set by a pressurizing means such as a spring (which is described later with reference to FIG. 13) to 10 to 12 kgf/cm which is larger than that under which the transfer roller 4a and the pressurizing roller 4b are pressed against each other.

Sheets 8 of recording paper stored in a cassette 7 as a stack of sheets and constituting recording media are fed out of the cassette one by one by a feed roller 9 and a pair of frictional rollers 10a and 10b. They are fed to the transfer section 4 in synchronism with the feed of the transfer medium 1 so that the image region of the transfer medium 1 is aligned with each of the recording paper sheets 8. This feed is achieved by the control of the feed timing which is based on the detection of the forward end of each of the recording paper sheets 8 by a friction sensor 26 composed of a light emitting diode 26a and a phototransistor 26b.

How images are recorded using the thus-arranged recording apparatus will now be described.

It is noted that this embodiment refers to an example in which heat is applied in accordance with picture signals, and light s irradiated uniformly.

Figure 5:
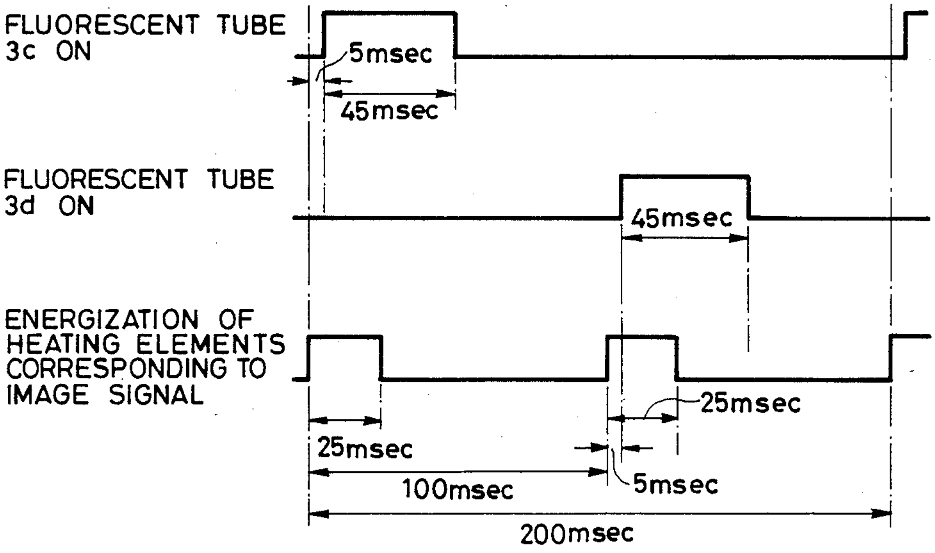
FIG. 5 is a chart showing timings at which heat and light are applied.

The transfer medium 1 is sequentially fed out of the supply roll 2 by driving a motor. Light and heat are applied to the transfer layer 1b of the fed out transfer medium 1 in accordance with picture signals in the recording section 3 so as to form an image thereon The transfer layer 1b has characteristics whose softening point is increased, i.e., its transfer characteristics change irreversibly, by the application of light and heat having predetermined wavelengths thereto, so that it is not transferred on the recording paper sheet 8. Therefore, for recording the magenta, the heating elements in the heating element array 3b which correspond to the magenta in the picture signals are not energized but the heating elements which correspond to the white in the picture signals (it is assumed that the recording paper sheets 8 are in white) are energized for 25 ms, as shown in FIG. 5. This is followed by the uniform irradiation by the fluorescent lamp 3c for 45 ms which starts 5 ms after the energization of the heating elements.

For recording the blue, the heating elements which correspond to the blue in the picture signals are not energized but the heating elements corresponding to the white in the picture signals are energized. This second energization starts 50 ms after the completion of the irradiation by the fluorescent lamp 3c, i.e., 100 ms after the start of the first energization of the heating elements, and lasts for 25 ms. This is followed by uniform irradiation by the fluorescent lamp 3d which starts 5 ms after the second energization of the heating elements and lasts for 45 ms.

Thus, a negative image is formed on the transfer layer 1b in response to the blue, magenta, and white picture signals by the control of the recording head 3a, and this process is repeated with a period of 200 ms/line while the transfer medium 1 is being conveyed in synchronism with this speed.

Subsequently, the the transfer layer 1b which carries the image is brought into contact with and is pressed against the recording paper sheet 8 in the transfer section 4 while the heat is being applied thereto so that the image in two colors of blue and magenta is transferred on the recording paper sheet 8. Having passed through the transfer section 4, the transfer medium 1 and the recording paper sheet 8 are separated by the peel-off roller 5. The transfer medium 1 is then wound around the winding roll 6, and the recording paper sheet 8 which carries the image goes to the fixing section 14.

The recording paper sheet 14 which has reached the fixing section 14 is heated and pressurized while it is passing between the fixing roller 14a and the pressurizing roller 14b, by which the transferred image is firmly fixed on the recording paper sheet 8. The recording paper sheet 8 is then discharged in a tray 11. In this embodiment, the fixing section 14 fixes the transferred image by the application of both pressure and heat. However, the present invention is not limited to this form, and either heat or pressure may be applied to the recording paper sheets for fixing the image thereto.

Thus, one-shot recording in two colors is completed with the transferred image firmly fixed to the recording paper sheet 8.

Figure 6:
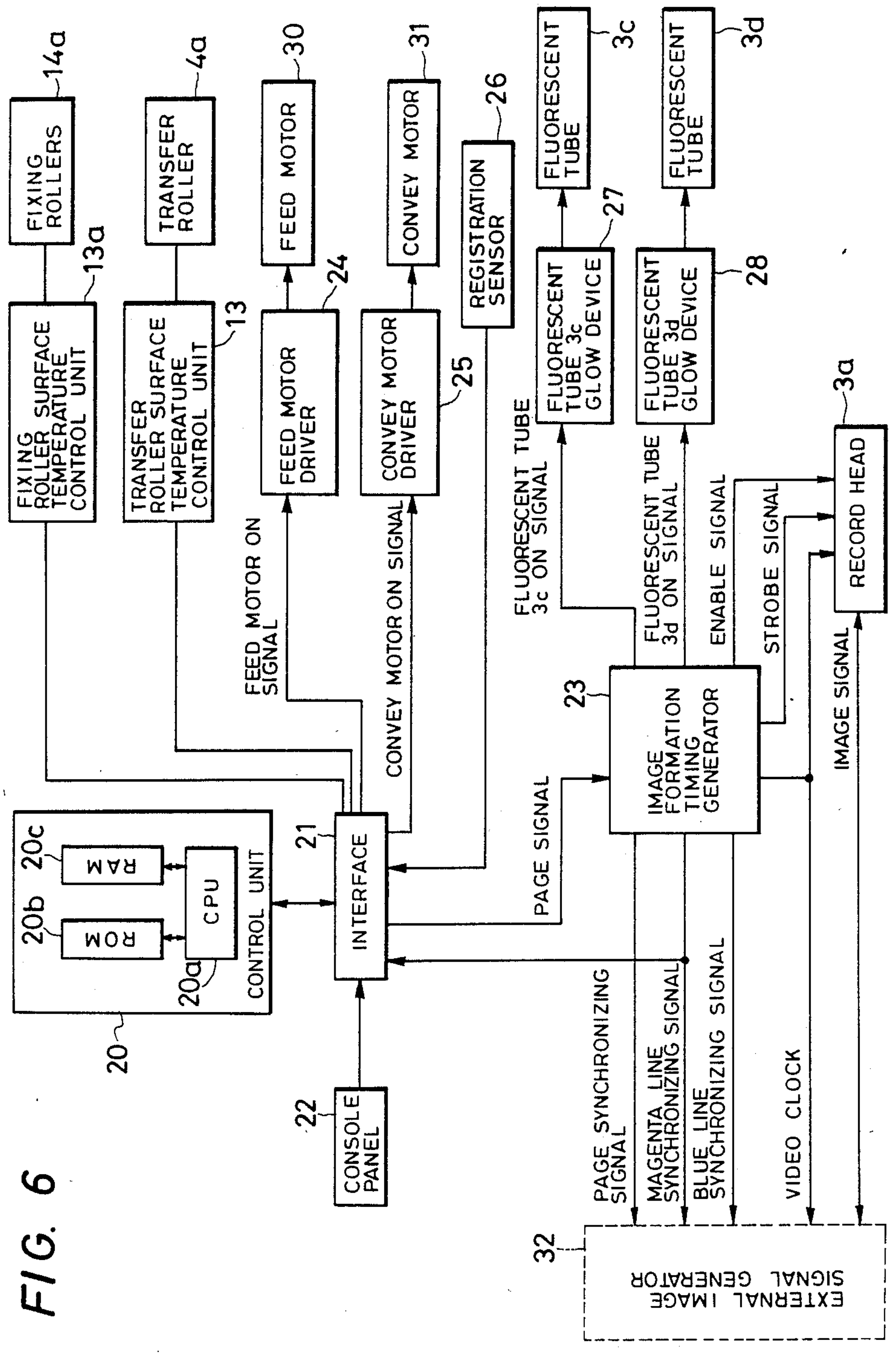
FIG. 6 is a block diagram of a control system.
Figure 7:
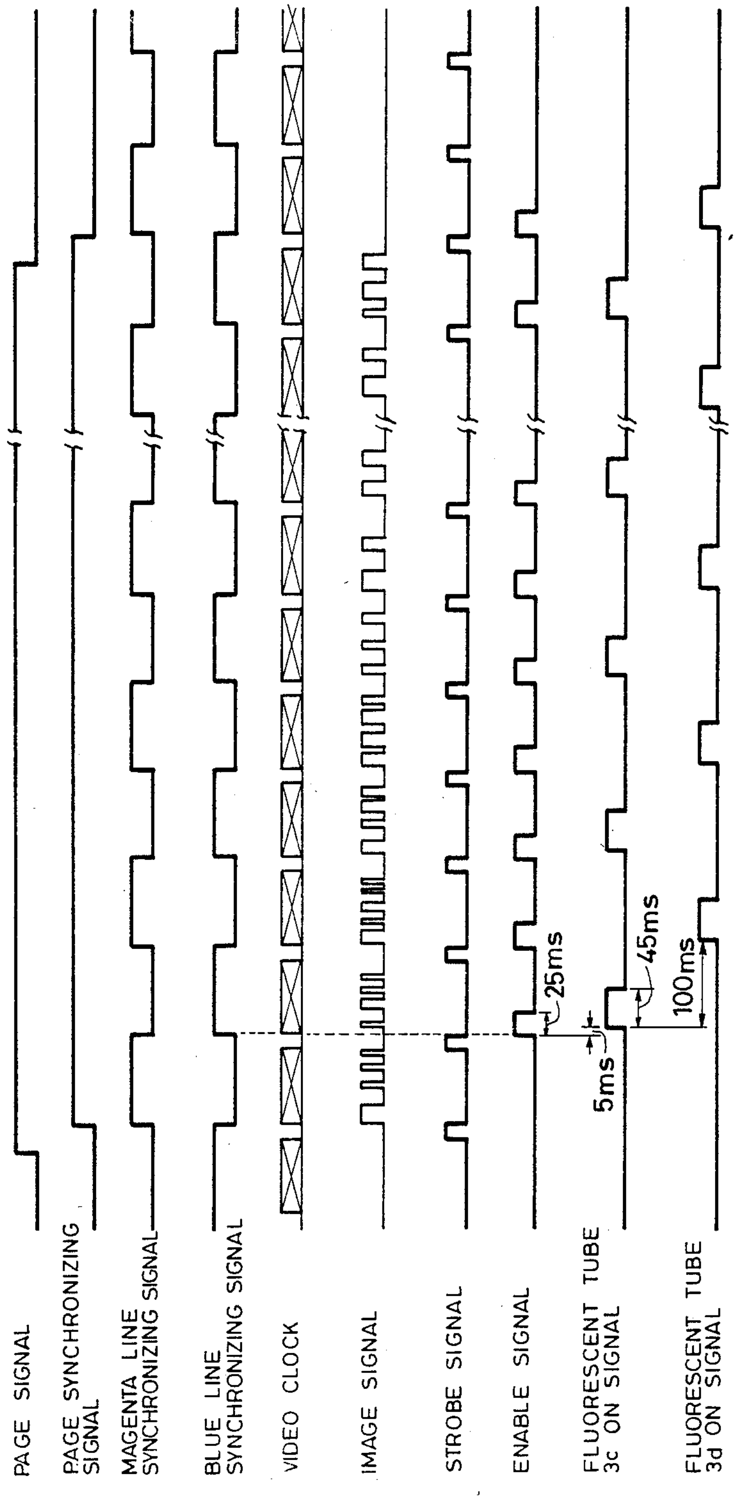
FIGS. 7 and 8 are timing charts for a recording operation.
Figure 8:
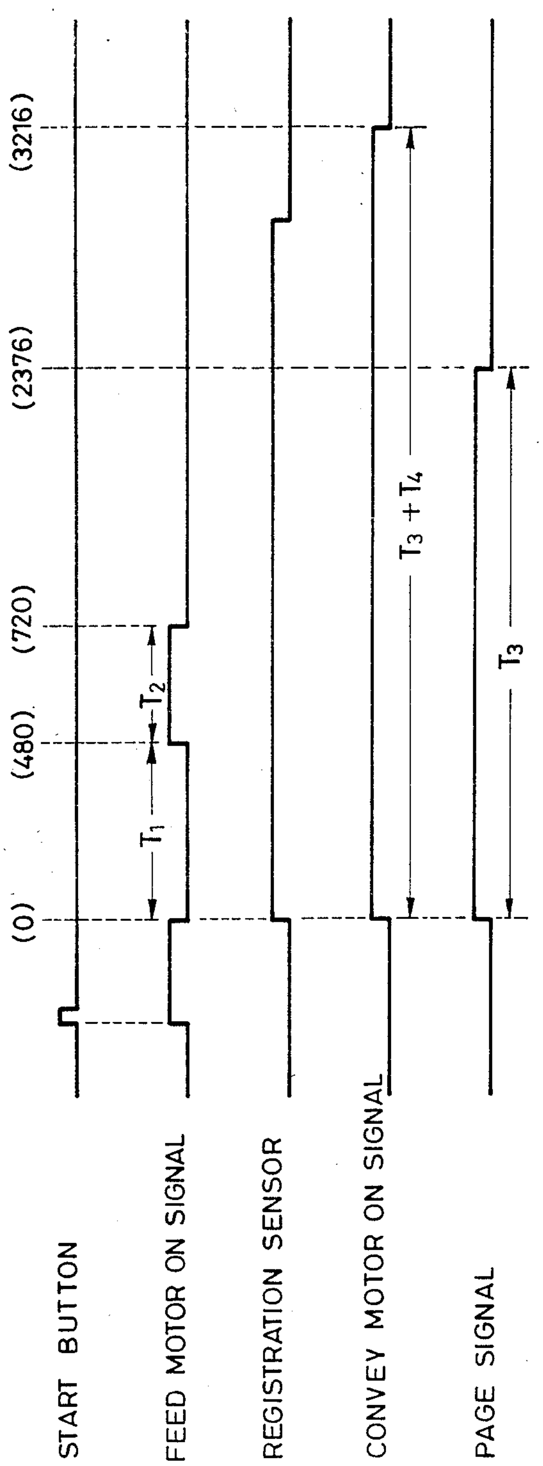
Figure 9:
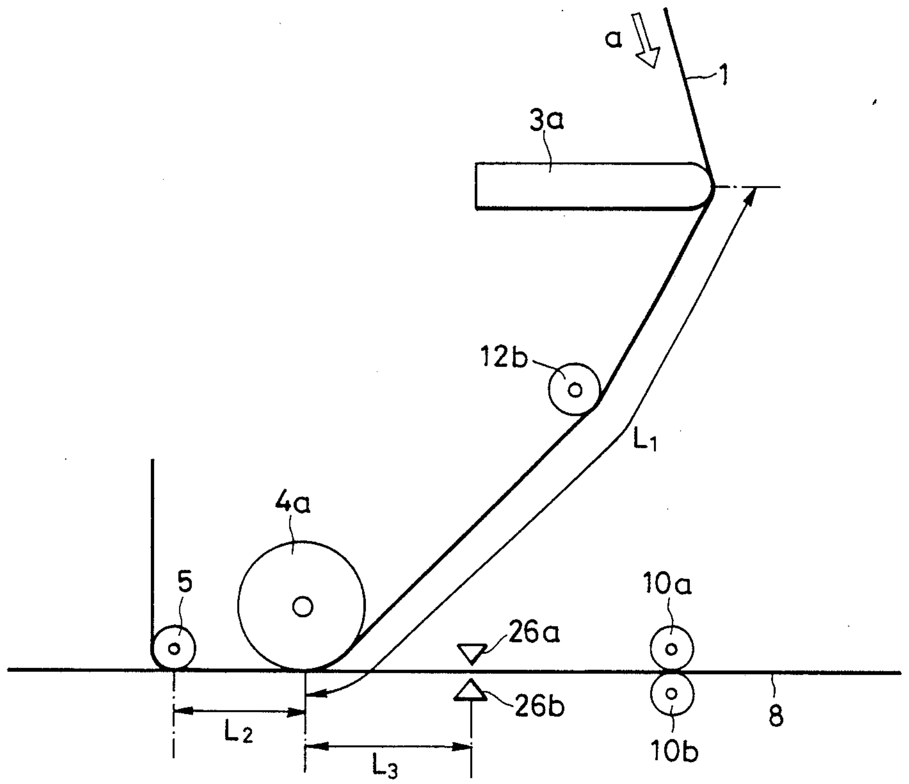
FIG. 9, shows the relationship between the components.
Figure 10:
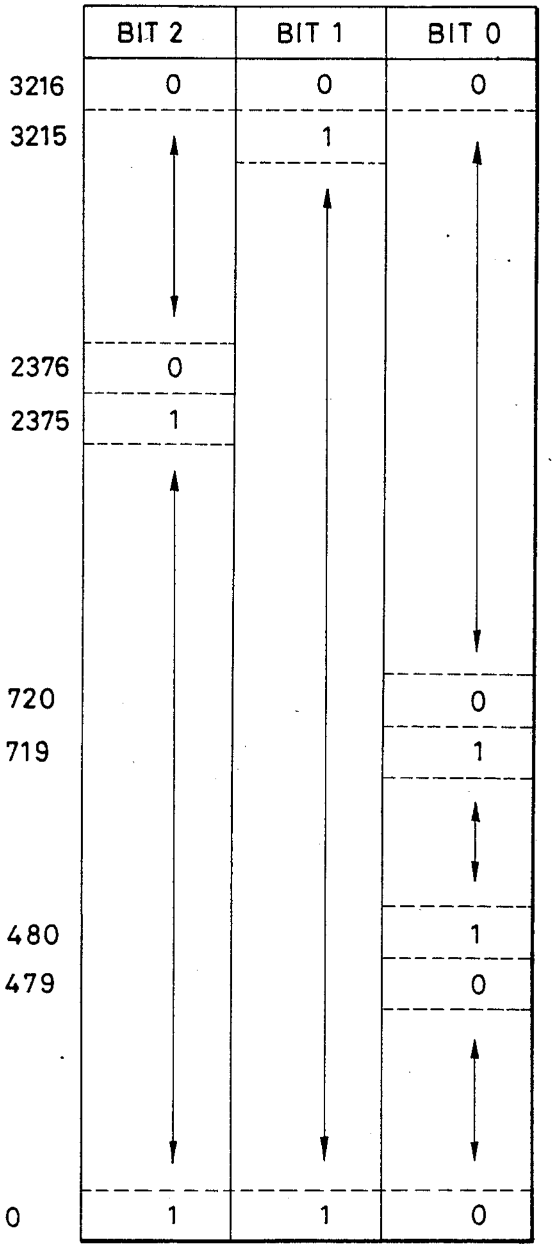
FIG. 10 shows a sequence table on which the sending out of signals is based.
Figure 11:
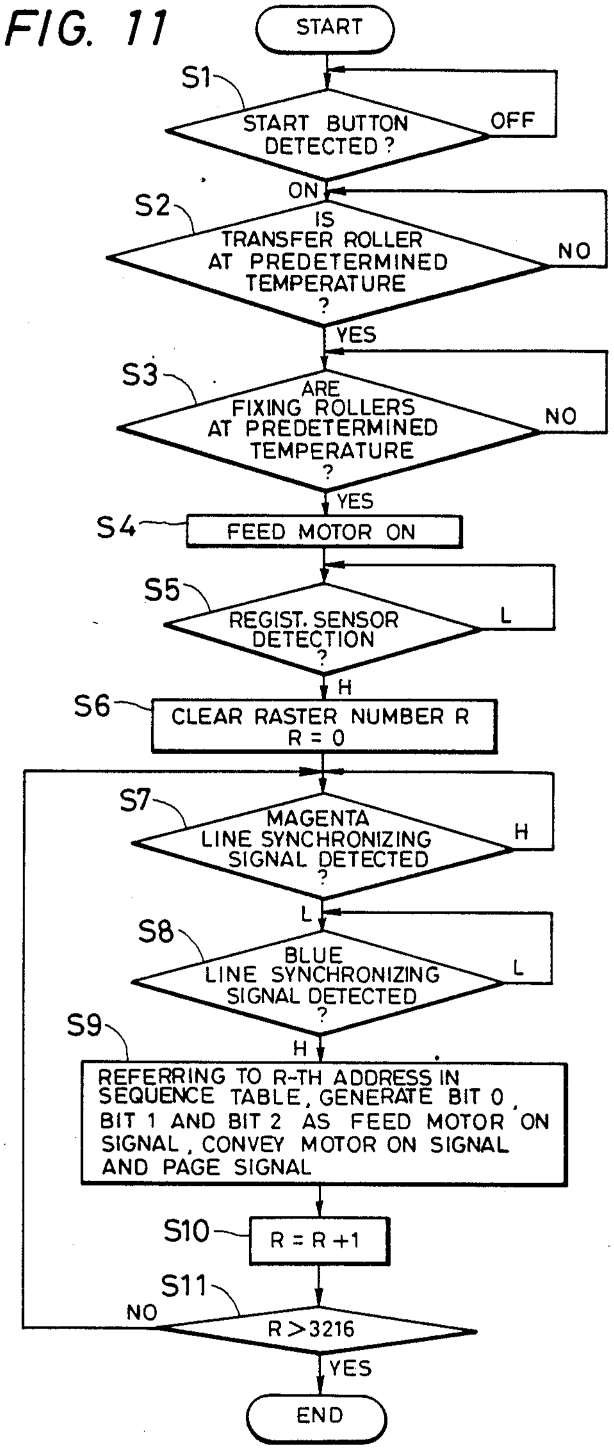
FIG. 11 is a flowchart of the recording operation.
Figure 13:
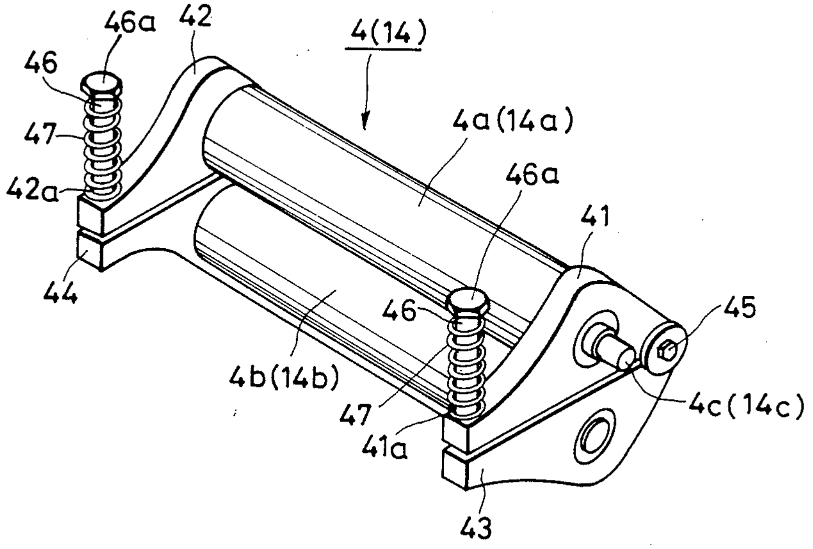
FIG. 13 is a perspective view of the transfer and fixing sections, showing their pressure application mechanisms.

The control system associated with this embodiment which controls the above-described recording operation will be described in a concrete manner with reference to FIGS. 6 to 13. FIG. 6 is a block diagram of the control system, FIGS. 7 and 8 are timing charts of the recording operation, FIG. 9 shows the relationship between the components, FIG. 10 is a sequence table used for sending out signals, FIG. 11 is a flowchart of the recording operation, and FIG. 12 is a circuit diagram of the temperature control system for the transfer roller 4a and the fixing roller 14a, and FIG. 13 is a perspective view of a pressurizing mechanism for the transfer and fixing sections.

The control system includes: a control section 20 having a CPU 20a such as a microprocessor, a ROM 20b for storing the control program for the CPU 20a and various data, and a RAM 20c used as a work area for the CPU 20a as well as to store various data temporarily; an interface 21; a operation panel 22; an image formation timing generator 23; a feed motor driver 24; a conveying motor driver 25; a friction sensor 26; respective fluorescent lamp lighting devices 27 and 28; a transfer roller surface temperature control section 13; and a fixing roller surface temperature control section 13a.

The control section 20 inputs various data from the operation panel 22 through the interface 21 (such as data on recording strength, the number of copies, or the size of the recording paper), signals from the friction sensor 26, and magenta line synchronizing signals generated in the image formation timing generator 23. Also, the control section 20 outputs through the interface 21 motor ON signals for a feed motor 30, motor ON signals for a conveying motor 31, and page signals.

The image formation timing generator 23 generates various signals (magenta line synchronizing signals, blue line synchronizing signals, page synchronizing signals, video clock, enable signals, strobe signals, fluorescent lamp ON signals and so on) by demultiplying the frequency of the clock generated by a quartz-crystal oscillator incorporated in the image formation timing generator 23.

Both of the magenta line synchronizing signals and the blue line synchronizing signals have a period of 200 ms and a 50% duty cycle, and are 180 degrees out-of-phase with each other, as shown in FIG. 7. The page synchronizing signals are generated when the page signals output from the control section 20 through the interface 21 are latched at the rising edge of each of the magenta line synchronizing signals.

The video clock is signals which are generated at a frequency of 25 KHz at the rise of the magenta and blue line synchronizing signals and are stopped each time a total of 1728 clocks (this taking about 69 ms) (the recording head 3a of this embodiment has a total of 1728 pixels a line) has been generated.

An external picture signal generator (such as a facsimile machine, an image scanner, an electronic black board, or an electronic typewriter) 32 receives the page synchronizing signals, the magenta and blue line synchronizing signals, and video clock from the image formation timing generator 23, and generates in synchronism with the video clock a total of 1728 magenta picture signals each time the level of the magenta line synchronizing signal is high, as well as a total of 1728 blue picture signals each time the level of the blue line synchronizing signal is high, after the page synchronizing signal rises.

The strobe signals are high during each period in which the magenta and blue line synchronizing signals are high but the generation of the video clock is terminated.

The enable signals are high for 25 ms from the rising edge of the magenta and blue line synchronizing signals. Generation of the enable signals terminates with that of an enable signal of high level which is generated when the magenta line synchronizing signal rises for the first time after the page synchronizing signal falls, and lasts 25 ms. The enable signals are used to energize the heating element array 3b in correspondence with the picture signals shown in FIG. 5.

The image formation timing generator 23 also generates the fluorescent lamps ON signals. The ON signals for the fluorescent lamp 3c rise 5 ms after the rise of the first enable signal and falls 45 ms after it has risen. The ON signals for the fluorescent lamp 3c are repeatedly generated every other time the enable signals are generated. The ON signals for the fluorescent lamp 3d are generated in the same manner 100 ms after the generation of each of the ON signals for the fluorescent lamp 3c.

The above-described signals are used to drive the recording head 3a and the fluorescent lamps 3c and 3d. The recording head 3a inputs the picture signals delivered from the external picture signal generator 32 to a shift register provided within the head by the video clock delivered from the image formation timing generator 23. The picture signals are then latched in a latch register within the head by the strobe signal delivered from the image formation timing generator 23, so that the enable signal delivered from the image formation timing generator 23 afterwards can energize the heating elements 3b in accordance with the picture signals stored in the latch register. A subsequent series of picture signals are input to the shift register concurrently with the energization of the heating elements.

The lighting devices 27 and 28 for fluorescent lamps 3c and 3d receive the ON signals for the fluorescent rescent lamps 3c and 3e delivered from the image formation timing generator 23, and light the corresponding sponding fluorescent lamps 3c and 3d while the 0N signals for the fluorescent lamps 3c and 3d are high.

Thus, an image is formed on the transfer medium 1 by the above-described control operation.

Control on the conveyance of the transfer medium 1 and the sheets 8 of the recording paper which is done to transfer the image formed on the transfer medium 1 onto the sheet of recording paper 8 will now be described.

The feed motor driver 24 drives the feed motor 30 while the feed motor ON signal delivered from the control section 20 through the interface 21 is high, by which the feed roller 9 and the pair of frictional rollers 10a and 10b are rotated and the sheet 8 of the recording paper is thereby conveyed at a fixed speed.

Similarly, the conveying motor driver 25 drives the conveying motor 31 while the conveying motor ON signal delivered from the control section 20 through the interface 21 is high, by which the transfer roller 4a is rotated so that the transfer medium 1 and the sheet 8 of the recording paper are conveyed at a fixed speed in cooperation with the pressurizing roller 4b rotatingly driven by the transfer roller 4a.

FIG. 8 shows the timings at which various signals are delivered to and from the control section 20 through the interface 21. In the figure, times T1 to T4 denote the times required to convey the transfer medium 1 or the sheet 8 of recording paper in the manner described below, if the distances between the components are assumed to be L1 to L3, respectively, as shown in FIG. 9:

L1: the distance through which the transfer medium 1 is conveyed from the recording head 3*a* to the pressing section of the transfer roller 4*a* and the pressurizing roller 4*b*.

L2: the distance through which the transfer medium 1 is conveyed from the pressing section to the peel-off roller 5.

L3: the distance through which the sheets 8 of recording paper are conveyed from the friction sensor 26 to the pressing section.

T1: the time required for the transfer medium 1 to be conveyed through L1 and L3.

T2: the time required for the sheets 8 of recording paper to be conveyed through the distance L3.

T3: the time required for the transfer medium 1 to be conveyed through a distance which corresponds to the length of the sheet 8 of recording paper (through 297 mm, if the paper 8 has the size of A 4).

T4: the time required for the transfer medium 1 to be conveyed through the distance of L1+L2.

More specifically, when an operator presses the start button on the operation panel 22, the feed motor 30 starts driving the feed roller 9 and the frictional rollers 10*a* and 10*b* by which the sheet 8 of recording paper is fed out of the cassette. The feed motor 30 stops the operation the moment the forward end of the sheet 8 reaches the friction sensor 26. Concurrently with the termination of the operation of the feed motor 30, the conveying motor 31 starts driving the transfer roller 4*a* by which the transfer medium 1 is conveyed in the direction indicated by the arrow a in FIG. 1, and at the same time the page signal rises and its level remains high for the time T3 so as to enable the transfer image formation process to takes place in the recording section 3.

The conveying motor 31 stops after the time T3 required for an image to be formed and another time T4 have elasped.

The feed motor 30 drives the rollers for the time T2 the time T1 after the conveyance of the transfer medium 1 has been started so as to convey the sheet 8 of the recording paper at the same speed at which the transfer medium 1 is conveyed before it stops the operation. This enables the sheet 8 of recording paper to be brought into contact with and conveyed together with the transfer medium 1 by the conveying motor 31 in the state wherein the forward end of the sheet 8 of recording paper is aligned with the forward end of the image formed on the transfer medium 1 in the transfer section 4.

Regarding the operation of the control section 20 which delivers various signals shown in FIG. 8, the section 20 inputs the magenta line synchronizing signals through the interface 21 to count the number thereof by a software counter, i.e., to supervise the timing of operation by the counting of the number of magenta line synchronizing signals having a period of 200 ms.

The control section 20 has a sequence table such as that shown in FIG. 10. It outputs the feed motor ON signals, the conveying motor ON signals, and the page signals, respectively, with reference to the sequence table sequentially while counting the number of magenta line synchronizing signals after the friction sensor signals has risen, and thereby drives the corresponding components.

In this embodiment, the sequence table is of a 3-bit type, as shown in FIG. 10. Each bit represents a total of 3217 words from a 0th word to a 3216th word. Bit 0 corresponds to the feed motor ON signals, while bits 1 and 2 respectively correspond to the conveying motor ON signals and the page signals.

The bracketed figures on the upper portion in FIG. 8 indicate the serial numbers of the magenta line synchronizing signals (the total numbers of magenta line synchronizing signals) for the moments at which the above-described signals are output with the magenta line synchronizing signal output the moment the friction sensor signal rises being 0th.

A series of operations by the control section 20 having the above-described functions will now be described with reference to the flowchart of FIG. 11. First, it is detected whether or not the start button on the operation panel is pressed (in S1). Subsequently, it is detected whether or not the temperature of the transfer roller 4*a* has reached a predetermined value (in S2), and it is detected whether or not the temperature of the fixing roller 14*a* has reached a predetermined value (in S3). If the temperatures of the two rollers have reached the predetermined values, the feed motor ON signal is output (in S4). Thereafter, R representing the raster number of the sequence table is replaced by 0 (in S6), when it is detected that the friction sensor signal has risen (in S5). It is then detected whether or not the level of the magenta line synchronizing signal is low (in S7), and it is detected whether or not the level of the magenta line synchronizing signal is high (in S8) so as to detect the rising edge of the magenta line synchronizing signal. After the edge has been detected, bits 0 to 2 are output as the feed motor ON signal, the conveying motor ON signal, and the page signal, respectively, with reference to each R in sequence table (in S9). Thereafter, 1 is added to each R (in S10), and it is judged whether or not R is larger than 3216. If R is equal to or smaller than 3216, the process returns to Step 7 so as to continue the recording. If R is larger, the recording is terminated.

Temperature control for the transfer roller 4*a* used to transfer the thus-formed image on the sheet 8 of recording paper in the transfer section 4 by the application of heat is structured as shown in FIG. 12.

The thermistor 33 shown in FIG. 12 is disposed adjacent to the surface of the transfer roller 4*a*. The electrical resistance of the thermistor 33 changes in accordance with the temperature of the surface of the transfer roller 4*a*. The changed resistance of the thermistor is converted into a voltage E2 by the power source and the resistor 34 and is compared with the reference voltage E01 by the comparator 35. The output of the comparator 35 controls through a relay driver 36 energization of the halogen heater 4*c* connected to a power source E3 through a relay (not shown).

The voltage E2 can be converted into a digital signal by an AD converter 37. This digital signal is input to the control section 20 through the interface 21 so that the control section can detect the temperature of the surface of the transfer roller 4*a*.

Principle of the operation of the above-described temperature control structure will be described below. Since the thermistor 35 has characteristics whose electrical resistance decreases as its temperature is increased, the resistance of the thermistor 33 decreases as the temperature of the surface of the transfer roller 4a is increased, decreasing the voltage E2. Reversely, as the temperature of the surface of the transfer roller 4a is decreased, the electrical resistance of the thermistor 33 increases, increasing the voltage E2. Therefore, if the reference voltage E01 is set to a value of the voltage E2 which corresponds to 95° C. of the temperature of the surface of the transfer roller 4a, the comparator 35 outputs a high level signal when the surface temperature of the transfer roller 4a is lower than 95° C., by which the halogen heater 4c is energized so as to raise the surface temperature of the transfer roller 4a. Reversely, when the surface temperature of the transfer roller 4a is at 95° C. or higher, the halogen lamp 4c is not energized and the surface temperature is therefore lowered. Thus, the temperature of the surface of the transfer roller 4a is kept between 90 and 100° C. by the above-described control. The voltage E2 is converted into a digital signal by the AD converter 37. The digital signal is input to the control section 20 through the interface 21 so that the control section can detect the temperature of the surface of the transfer roller 4a. This control system is on while the power switch of the apparatus is being on, so that the temperature of the surface of the transfer roller 4a can already be between 90° and 100° C. when the start button on the operational panel is pressed. If the temperature has not reached 90° C. when the start button is pressed, the apparatus does not start the operation even if the start button is pressed.

Thus, the image is formed on the transfer medium 1 and is then transferred on the sheet 8 of recording paper as an image in two colors of magenta and blue in the transfer section 4.

Subsequently, the transfer medium 1 and the sheet 8 of recording paper are separated from each other by the peel-off roller 5. The sheet 8 of recording paper which carries thereon an image of a desired color is then passed through the fixing section 14 where the image is firmly fixed to the sheet 8 of recording paper, before being discharged in the tray 11. The temperature control of the fixing section 14 is performed in the same manner by the fixing roller surface temperature control circuit 13a shown in FIG. 12.

This completes a one-shot recording of the image in two colors.

FIG. 13 is a perspective view of the pressurizing mechanism employed in the transfer and fixing sections.

Reference numerals 41 and 42 denote upper supports which rotatably bear the two ends of the transfer roller 4a (or the fixing roller 14a). Reference numerals 43 and 44 denote lower supports which rotatably bear the two ends of the pressuring roller 4b (or 14b). Reference numeral 45 denotes a shaft which detachably couples two sets of supports 41 and 43, and 42 and 44. Reference numerals 46 denote bolts having an externally threaded portion at the distal end. The externally threaded portions of the bolts 46 are engaged with the internally threaded portions provided in the lower supports 43 and 44 by which the bolts are fixed to the lower supports 43 and 44. The bolts 46 loosely pass through openings 41a and 42a formed in the upper supports 41 and 42. Reference numerals 47 denote pressurizing compression springs which extend between the upper portions 46a of the bolts 46 and the upper supports 41 and 42 so as to apply pressure between the upper and lower supports and thereby press the pressurizing roller 4b (or 14b) against the transfer roller 4a (or the fixing roller 14a). The pressing force applied between the two rollers can be adjusted by turning the bolts 46 clockwise or counterclockwise according to this pressurizing mechanism.

Next, another examples of each section will be described below.

(i) Transfer medium

The above-described embodiments relate to an example of recording images in two colors. As the present applicant has disclosed in the specification of Japanese Patent Application No. 128814/1986, however, a single color, a multi-color (three or more colors), or a full-color image recording may also be enabled, if the types of coloring agent and reaction initiators constituting the image forming element assemblies are suitably selected, a light source which irradiates light having the wavelength which can initiate reaction of these reaction initiators is selected, and processes described in the above-mentioned patent application are employed.

In the above-described embodiments, the image is transferred on the sheet 8 of recording paper by a change in the softening point of the transfer layer 1b made of a polymer with a coloring agent contained therein, the change being caused by application of energy in the form of both heat and light. However, transfer of the image may also be performed by a change in the adhesive or sublimate characteristics of the transfer layer. Alternatively, the sheets 8 of recording paper may be provided with coloring characteristics, and a layer for changing the coloring characteristics of the sheets 8 of recording paper may be provided on the transfer medium 1 so as to allow the image formed on the transfer medium 1 to be transferred on the sheet 8 of recording paper.

The first and second energies applied to the transfer layer 1b are not limited to the heat and light energies but another energies including pressure energy may be used for forming images.

In these embodiments, the base 1a of the transfer medium 1 is made of polyethylene terephthalate. However, it may also be formed of a polyamide, a polymide, a capacitor tissue, or a sheet of cellophane.

Any type of transfer layer 1b may be used, if the transfer layer 1b is of a type whose property is caused to change by application of a plurality of types of energy so as to allow the images to be formed thereon. Suitable types of transfer layer 1b include those whose melting temperature, softening point, glass transition point, or viscosity changes by the application of the plurality of types of energy.

Each of the image forming element assemblies forming the transfer layer lb contains a sensitive component and a coloring component. It is desirable to employ a sensitive component whose property begins to change or whose rate of reaction for causing change in its property changes suddenly by the application of a plurality of types of energy.

A polymerizable component may be used as a sensitive component, and suitable polymerizable components include monomers, oligomers and polymers which can cause polyreaction or crosslinking reaction.

The suitable monomers or ligomers include polyvinyl cinnamate, p-methoxycinnamic acid, a half ester of succinic acid, and those whose end or side chain has a reactive group, such as epoxy resins or unsaturated polyester resins.

The suitable polymerizable monomers include ethylene glycol diacrylate, and propylene glycol diacrylate.

If any of the polymerizable monomers or oligomers is used, cellulose acetate succinate or methyl methacrylate-hydroxyethyl methacrylate copolymer may be contained in order to improve ability of forming the layer.

In order to cause reaction of the polymerizable component, reaction initiator is added, if necessary. Suitable reaction initiators include radical reaction initiators such as azo compounds, organic sulfur compounds, carbonyl compounds, or halogen compounds.

In particular, suitable reaction initiators that can be employed to form a transfer layer which allows the images to be formed by the application of energy in the form of both heat and light include those which ensure that the rate of reaction of the polymerizable component with the reaction initiator which acts on receipt of the light energy is largely affected by the temperature, when used with any of the polymerizable components.

Such combinations of polymerizable component and reaction initiator include a combination of any polymerizable prepolymer having functional groups, such as a copolymer of ester mecharylate or acrylic ester, any light-sensitive crosslinking agent, such as tetraethylene glycol diacrylate, and any reaction initiator, such as benzophenone, or Michler's ketone.

A coloring agent is a component contained for forming an optically recognizable image. Any of various types of pigment or dyes is used as a coloring agent. Such pigments or dyes include an inorganic pigment such as carbon black or lead yellow, an organic pigment such as Victoria Blue lakes or fast sky blue, a leuco dye, and a phthalocyanine dye.

Any of stabilizing agents, such as hydroquinone, or p-methoxyphenol, may be contained in the transfer layer 1*b*.

Any of sensitizers, such as p-nitroaniline or 1, 2-benzanthraquinone, may be contained in the transfer layer in order to improve the activation of the reaction initiator with respect to the energy applied.

In addition to the coloring agent and sensitive component, the transfer layer 1*b* may contain a binder which may be a resin, a wax, or a liquid crystal.

Suitable resins that can be used as a binder include polyester or polyamide resins. At least one of these resins may be used as a binder.

Suitable waxes that can be used as a binder include a vegetable wax, such as canelilla wax or carnauba wax, an animal wax, such as whale wax, a mineral wax, such as montan wax, and a synthetic wax, such as fatty acid, fatty amide, or ester. At least one of these waxes may be used as a binder.

Suitable liquid crystals that can be used as a binder include cholesterol hexanoate and cholesterol decanoate.

If the image forming element assemblies which form the transfer layer 1*b* are in a micro-capsular form, the cores are made of the materials described above, and the walls of the micro-capsules are made of gelatin and gum arabic, a cellulose, such as nitro cellulose or ethyl cellulose, or a polymer, such as polyethylene or polystyrene.

(ii) Recording section

In the above-described embodiment, light beams having predetermined wavelengths which are capable of generating desired colors are irradiated on the transfer medium 1 from the side of the transfer layer 1*b*, and heat is applied in accordance with the picture signals to the transfer medium from the side of the base 1*a*. However, heat may be applied uniformly while the predetermined type of light beams are irradiated on the transfer medium in accordance with the picture signals.

If the base 1*a* is made of a transfer material, irradiation of light beams may be performed on the side of the base 1*a*, and application of heat may be conducted on the side of the transfer layer 1*b*.

In the embodiment described above, light irradiation and heat application are performed on the two sides of the base 1*a*. However, they may be conducted on the one side thereof for forming images.

A combination of a yttrium alminium garnet laser and a polygon mirror may be used as a heating means in place of the recording head 3*a* for selectively heating the heating elements.

A light emitting array or a combination of Xenon lamp and a filter which assures the light absorption characteristics of the material employed may be used as a light irradiating means in place of the fluorescent lamps 3*c* and 3*d*.

In the embodiment described above, light energy and heat energy are applied to the transfer layer 1*b* at one time. However, both types of energy may be applied at different times.

(iii) Transfer section

The structure of the transfer section is not limited to roller-shaped components such as the transfer roller 4*a* and the pressurizing roller 4*b*, but the transfer section may be any of those which ensures a predetermined pressure therebetween, such as rotary belts.

(iv) Recording medium

The recording medium is not limited to that employed in the present embodiment, but a plastic sheet used for an overhead projector (OHP) may also be used.

(v) Fixing section

In this embodiment, the heat and pressure applied to the sheets 8 of recording paper in the fixing section 14 are set to values which are higher than those of the heat and pressure applied in the transfer section 4. However, either of the heat and pressure applied to the sheets 8 of recording paper in the fixing section 14 may be set to a value which is higher than that of the heat or pressure applied in the transfer section so as to improve the fixing ability.

The fixing section 14 and the transfer section 4 in this embodiment are constructed by roller-shaped components. However, the structure of those sections is not limited to those, but any of those which ensure a predetermined pressure therebetween such as rotary belts may be employed.

The values of the heat and pressure applied to the sheets 8 of recording paper in the fixing section 14 are not limited to those shown in this embodiment, but they may be appropriately selected in accordance with the characteristics of the transfer layer 1*b* or the conditions of the surface of the sheets 8 of recording paper.

As will be understood from the foregoing description, since the image is formed on the transfer medium and this image is transferred on the recording medium in two sequential processes, an image can be formed excellently on the recording medium having a relatively low degree of surface smoothness.

Further, since the image transferred on the recording medium is firmly fixed in the fixing section, the transfer section involves only the image formation on the recording paper. More specifically, since the transfer and fixing functions are separated, it is not required that excessive pressure and heat are applied in the transfer section, so that the image on the transfer medium can be faithfully transferred on the recording medium, enabling fine image recording.

If the present invention is applied to a multicolor recording, a recording medium is not required to be moved in a complicated manner, and improvement of the quality of color mixture is enabled by the application of heat or pressure, enabling recording of an image having a good quality.

What is claimed is:

1. An image recording apparatus for recording an image onto a medium to be recorded, comprising:

conveying means for conveying a transfer recording medium having a transfer recording layer of which transfer characteristics vary upon application of a first energy and a second energy which is different from said first energy;

a recording section disposed along the conveying path of said transfer medium conveyed by said conveying means, said recording section having a first energy applying means for applying said first energy to said transfer medium and a second energy applying means for applying said second energy to said transfer medium;

a transfer section having a heating means and a pressure applying means used to transfer the image formed on said transfer medium in said recording section on said recording medium; and a fixing section for fixing the image transferred on said recording medium in said transfer section to said recording medium, wherein said fixing section applies to said recording medium either or both of heat and pressure greater than heat and pressure applied at said transfer section.

2. A method of recording images on a recording medium by utilizing a conveying means for conveying a transfer recording medium having a transfer recording layer of which transfer characteristics vary upon application of a first energy and a second energy which is different from said first energy; comprising the steps of:

applying said first energy and said second energy to said transfer medium;

transferring the image formed on said transfer medium by said energy applying step to said recording medium; and fixing the image transferred to said recording medium in said transfer step to said recording medium, wherein said fixing section applies to said recording medium either or both of heat and pressure greater than the heat and pressure applied at said transfer section.

3. An apparatus for recording images according to claim 1, wherein said first energy is heat energy.

4. A method of recording images according to claim 2, wherein said first energy is heat energy.

5. An apparatus for recording images according to claim 1, wherein said second energy is light energy.

6. A method of recording images according to claim 2, wherein said second energy is light energy.

7. An apparatus for recording images according to claim 1, wherein said transfer characteristics are an irreversible reaction.

8. A method of recording images according to claim 2, wherein said transfer characteristics are an irreversible reaction.

9. An apparatus for recording images according to claim 1, wherein said change in said transfer characteristics is a change in a softening point.

10. A method of recording images according to claim 2, wherein said change in said transfer characteristics is a change in a softening point.

11. An image recording apparatus for recording an image onto a medium to be recorded, comprising:

conveying means for conveying a transfer recording medium having a transfer recording layer of which transfer characteristics vary upon application of a first energy and a second energy which is different from said first energy;

a recording portion provided along a conveyance route of said transfer recording medium conveyed by said conveying means, said recording portion having first energy applying means for applying said first energy and second energy applying means for applying said second energy;

a transferring portion for transferring an image formed on said transfer recording medium onto said recording medium at said recording portion, said transferring portion having first heating means generating heat; and a fixing portion for fixing an image transferred to said transfer recording medium onto said recording medium at said transferring portion, said fixing portion having second heating means for applying to said recording medium heat greater than heat applied by said first heating means.

12. An apparatus for recording images according to claim 11, wherein said first energy is thermal energy.

13. An apparatus for recording images according to claim 11, wherein said second energy is optical energy.

14. An apparatus for recording images according to claim 11, wherein said first energy is thermal energy and generates heat and is controlled in response to image information.

15. An image recording apparatus for recording an image onto a medium to be recorded, comprising:

conveying means for conveying a transfer recording medium having a transfer recording layer of which transfer characteristics vary upon application of a first energy and a second energy which is different from said first energy;

a recording portion provided along a conveyance route of said transfer recording medium conveyed by said conveying means, said recording portion having first energy applying means for applying said first energy and second energy applying means for applying said second energy;

a transferring portion for transferring an image formed on said transfer recording medium onto said recording medium at said recording portion, said transferring portion having first pressure applying means for applying the pressure; and a fixing portion for fixing an image transferred to said transfer recording medium onto said recording medium at said transferring portion, said fixing portion having second pressure applying means for applying to said recording medium pressure higher than pressure applied by said pressure applying means.

16. An apparatus for recording images according to claim 15, wherein said first energy is thermal energy.

17. An apparatus for recording images according to claim 15, wherein said second energy is optical energy.

18. An apparatus for recording images according to claim 15, wherein said first energy is thermal energy and generates heat and is controlled in response to image information.

19. An image recording apparatus for recording an image onto a medium to be recorded, said apparatus comprising:

conveying means for conveying a transfer recording medium having transfer recording layer transfer characteristics of which vary upon application of energy;

a first image forming portion provided along a conveyance route of said transfer recording medium conveyed by said conveying means for applying said energy to said transfer recording medium so as to form a first image onto said transfer recording medium;

a second image forming portion for applying thermal energy to said recording medium and said transfer recording medium when said recording medium and said transfer recording medium are in contact so as to form onto said recording medium a second image in accordance with said first image; and a fixing portion for fixing to said recording medium said second image formed on said recording medium at said second image forming portion, said fixing portion applying to said recording medium thermal energy greater than said thermal energy applied at said second image forming portion.

20. An image recording apparatus for recording an image onto a medium to be recorded, said apparatus comprising:

conveying means for conveying a transfer recording medium having transfer recording layer transfer characteristics of which vary upon application of energy;

a first image forming portion provided along a conveyance route of said transfer recording medium conveyed by said conveying means for applying said energy to said transfer recording medium so as to form a first image onto said transfer recording medium;

a second image forming portion for applying pressure to said recording medium and said transfer recording medium when said recording medium and said transfer recording medium are in contact so as to form onto said recording medium a second image in accordance with said first image; and a fixing portion for fixing to said recording medium said second image formed on said recording medium at said second image forming portion, said fixing portion applying to said recording medium pressure higher than said pressure applied at said second image forming portion.

21. An image recording apparatus according to claim 19, wherein said energy is optical energy.

22. An image recording apparatus according to claim 20, wherein said energy is optical energy.

23. An image recording apparatus according to claim 19, wherein said energy is thermal energy.

24. An image recording apparatus according to claim 20, wherein said energy is thermal energy.

25. An image recording apparatus according to claim 19, wherein said energy is controlled in accordance with image information.

26. An image recording apparatus according to claim 20, wherein said energy is controlled in accordance with image information.

* * * * *